United States Patent
Murphy et al.

(10) Patent No.: US 6,662,094 B2
(45) Date of Patent: Dec. 9, 2003

(54) METHOD OF INITIALLY CHARACTERIZING AN OCCUPANT OF A VEHICLE SEAT BASED ON WEIGHT AND SEAT BELT TENSION

(75) Inventors: Morgan D. Murphy, Kokomo, IN (US); Phillip E Kaltenbacher, II, Kokomo, IN (US); Scott E. Achor, Peru, IN (US); Charles A. Gray, Noblesville, IN (US); James F. Patterson, Greentown, IN (US); Duane D. Fortune, Lebanon, IN (US)

(73) Assignee: Delphi Technologies, Inc., Troy, MI (US)

( * ) Notice: Subject to any disclaimer, the term of this patent is extended or adjusted under 35 U.S.C. 154(b) by 55 days.

(21) Appl. No.: 10/075,984

(22) Filed: Feb. 15, 2002

(65) Prior Publication Data

US 2003/0158643 A1 Aug. 21, 2003

(51) Int. Cl.⁷ .............................................. B60R 21/00
(52) U.S. Cl. ...................... 701/45; 180/273; 180/271; 200/728.1; 200/734; 200/735
(58) Field of Search ............................ 701/45; 180/273, 180/271; 280/728.1, 734, 735

(56) References Cited

U.S. PATENT DOCUMENTS

| | | | | |
|---|---|---|---|---|
| 5,454,591 A | * | 10/1995 | Mazur et al. | 280/735 |
| 5,996,421 A | * | 12/1999 | Husby | 73/862.451 |
| 6,246,936 B1 | * | 6/2001 | Murphy et al. | 701/45 |
| 6,259,042 B1 | * | 7/2001 | David | 177/136 |
| 6,264,236 B1 | * | 7/2001 | Aoki | 280/735 |
| 6,341,252 B1 | * | 1/2002 | Foo et al. | 701/45 |
| 6,382,667 B1 | * | 5/2002 | Aoki | 280/735 |
| 2003/0033065 A1 | * | 2/2003 | Vos et al. | 701/45 |

FOREIGN PATENT DOCUMENTS

| | | | | |
|---|---|---|---|---|
| DE | 10049528 A1 | * | 4/2001 | B60R/21/01 |
| JP | 2001171480 A | * | 6/2001 | B60R/21/32 |

* cited by examiner

Primary Examiner—William A. Cuchlinski, Jr.
Assistant Examiner—Eric M Gibson
(74) Attorney, Agent, or Firm—Robert M. Sigler; Stefan V. Chmielewski

(57) ABSTRACT

An improved weight-based occupant characterization method reliably distinguishes between a minimum weight adult and a child seated on a booster seat. An early characterization of the seat occupant is made in an interval following a transition event such as a door opening or ignition state change that activates the occupant detection system. During this interval, an initial characterization routine monitors the seat belt tension and the raw seat pressure to identify signal values characteristic of a minimum weight adult or a child seated on a booster seat. If the indicated occupant weight during subsequent operation of the vehicle is inconsistent with the initial characterization, the initial characterization is discarded, and the seat occupancy is characterized based on the indicated occupant weight.

8 Claims, 4 Drawing Sheets

METHOD OF INITIALLY CHARACTERIZING AN OCCUPANT OF A VEHICLE SEAT BASED ON WEIGHT AND SEAT BELT TENSION

TECHNICAL FIELD

This invention relates to a method of characterizing the occupant of a motor vehicle seat for purposes of allowing or suppressing air bag deployment based on sensed occupant weight and seat belt tension, and more particularly to a method of distinguishing a minimum weight adult from a child on a booster seat.

BACKGROUND OF THE INVENTION

Vehicle occupant weight detection systems are useful in connection with air bags and other pyrotechnically deployed restraints as a means of characterizing the occupant for purposes of determining whether to allow or suppress deployment of the restraints. For example, it is generally desired to allow deployment for a child or small adult, and to suppress deployment or reduce deployment force for a small child, such as a six-year-old sitting on a booster seat. In the case of infant or child seats (referred to herein collectively as child seats) that are placed on the vehicle seat and cinched down with a seat belt, it is generally believed that deployment should be suppressed entirely.

As disclosed in the U.S. Pat. No. 6,246,936 to Murphy et al., issued on Jun. 12, 2001, and assigned to the assignee of the present invention, a tightly cinched child seat can be distinguished from a small adult (such as a $5^{th}$ percentile adult female) by detecting the variation in the sensed weight during vehicle movement. The occupant is characterized as a small adult if the variation exceeds a threshold, whereas the occupant is characterized as a child seat if the variation is below the threshold, as a tightly cinched seat belt severely restricts variance.

An issue that is not addressed in the above-mentioned patent, however, concerns distinguishing between a minimum weight adult (such as a $5^{th}$ percentile adult female) and a child seated on a booster seat. While it is important to reliably distinguish between the small adult and the child on a booster seat, the distinction is often difficult to reliably establish in a weight-based occupant characterization system since both types of occupant can produce approximately the same indicated weight, and the detected pressure variation of the occupants during vehicle movement may be similar. Accordingly, what is needed is a method of reliably distinguishing between a minimum weight adult and a child seated on a booster seat.

SUMMARY OF THE INVENTION

The present invention is directed to an improved weight-based occupant characterization method that reliably distinguishes between a minimum weight adult and a child seated on a booster seat. According to the invention, an early characterization of the seat occupant is made in an interval following a transition event such as a door opening or ignition state change that activates the occupant detection system. During this interval, an initial characterization routine monitors the seat belt tension and the raw seat pressure to identify signal values characteristic of a minimum weight adult or a child seated on a booster seat. Essentially, the pressure variation during the initial interval is significantly higher for a small adult than for a child on a booster seat, and the seat belt tension is significantly higher for a child on a booster seat than for a small adult. If the indicated occupant weight during subsequent operation of the vehicle is inconsistent with the initial characterization, the initial characterization is discarded, and the seat occupancy is characterized based on the indicated occupant weight.

BRIEF DESCRIPTION OF THE DRAWINGS

FIG. 2 depicts a main flow diagram,

FIG. 3 depicts a portion of the routine concerning the initial occupant characterization, and FIG. 4 depicts a portion of the routine concerning determination of suppression status.

DESCRIPTION OF THE PREFERRED EMBODIMENT

The present invention is disclosed in the context of a restraint system for an occupant of a vehicle passenger seat 10, where the occupant weight is detected based on the fluid pressure in a seat cushion bladder 12. In general, however, the present invention applies to other types of weight-based occupant detection systems as well, such as systems that sense the strain in a seat frame element, or systems that include a network of pressure sensitive cells distributed over the seating area.

Figure 1:
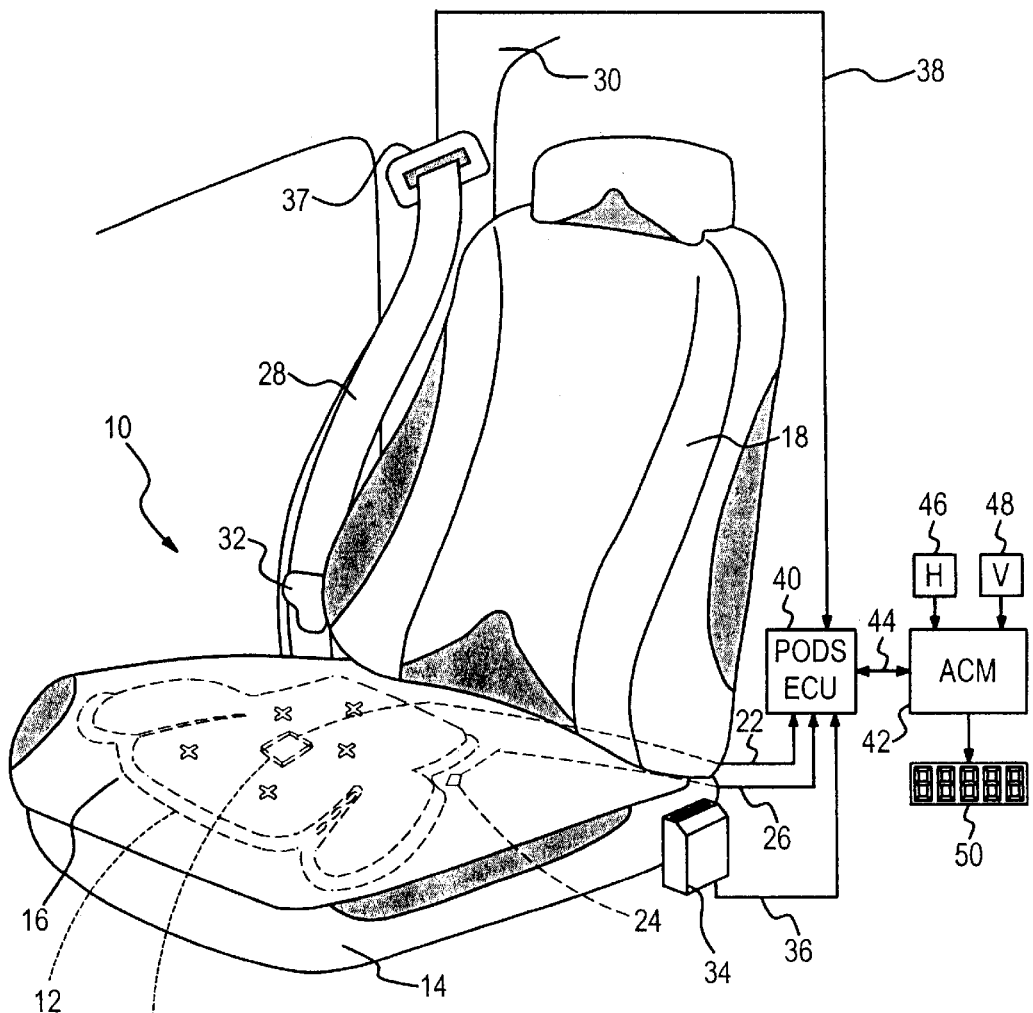
FIG. 1 is a system diagram illustrating a passenger seat of a vehicle equipped with a fluid-tilled bladder, a passenger occupant detection electronic control unit (PODS ECU) and an airbag control module (ACM) according to this invention.

Referring to FIG. 1, the vehicle seat 10 is supported on a frame 14, and includes foam cushions 16 and 18 on the seat bottom and back. The bladder 12 is disposed in or under the foam cushion 16 substantially parallel with the central seating surface, and preferably contains a fluid such as silicone which is non-corrosive, and not subject to freezing at extreme ambient temperatures. In addition, a semi-rigid back-plate may be placed under the bladder 12 to provide a suitable reaction surface, as disclosed for example in the U.S. patent application Ser. No. 09/311,576, filed May 14, 1999, assigned to the assignee of the present invention, and incorporated herein by reference. Alternatively, the bladder 12 may be placed between two semi-rigid back-plates to provide reaction surfaces on both sides of the bladder.

The bladder 12 is coupled to a pressure sensor 20, which provides an electrical output signal on line 22 indicative of the fluid pressure in the bladder 12. A temperature sensor 24 located in proximity to the bladder 12 provides an electrical output signal on line 26 indicative of the bladder and foam temperature. The sensor 24 can be provided as a separate sensor as indicated in FIG. 1, or may be integrated with the pressure sensor 20.

As also shown in FIG. 1, the seat 10 is equipped with a conventional shoulder/lap seat belt 28 anchored to the vehicle floor (not shown) and B-pillar 30. In use, the belt 28 is drawn around an occupant or through the frame of a child or infant seat, and a clip 32 slidably mounted on the belt 28 is inserted into the buckle 34 to fasten the belt 28 in place. A retractor assembly (not shown) mounted in the B-pillar 30 maintains a desired tension on the belt 28, and locks the belt 28 in place when the vehicle experiences significant deceleration. A sensor (not shown) within the buckle 34 detects insertion of the clip 32, and provides an electrical signal on line 36 indicative of the seat belt latch status (i.e., buckled or unbuckled). Additionally, a belt tension sensor 37 detects the tension applied to seat belt 28, and provides an electrical signal (BTS) indicative of the tension magnitude on line 38. The tension sensor 37 may be located in the B-pillar 30 as shown, near the floor on the outboard side of seat 10, or in any other convenient location, and may be constructed as disclosed, for example, in Research Disclosure No. 41402, October, 1998, Page 1304, incorporated herein by reference.

The electrical pressure, temperature, seat belt latch status and seat belt tension signals on lines 22, 26, 36 and 38 are provided as inputs to a passenger occupant detection system electronic control unit (PODS ECU) 40, which in turn, is coupled to an airbag control module (ACM) 42 via bi-directional communication bus 44. The ACM 42 may be conventional in nature, and operates to deploy one or more airbags or other restraint devices (not shown) for vehicle occupant protection based on the vertical and/or horizontal acceleration signals obtained from vertical acceleration sensor (V) 48 and horizontal acceleration sensor (H) 46, and occupant characterization data obtained from PODS ECU 40. In general, ACM 42 deploys the restraints if the acceleration signals indicate the occurrence of a severe crash, unless the PODS ECU 40 indicates that deployment should be suppressed. Of course, other more sophisticated controls are also possible, such as controlling the deployment force of the restraint devices based on the occupant characterization data provided by PODS ECU 40. Also, ACM 42 communicates the suppression status to a driver display device 50 to enable the driver to verify proper system operation.

In the illustrated embodiment, the primary function of PODS ECU 40 is to estimate occupant weight based on the pressure and temperature signal provided by the sensors 20 and 24, as described for example in the U.S. Pat. No. 5,987,370 to Murphy et al. (which is incorporated by reference herein), and to reliably distinguish between an empty seat and a seat having an object or unrestrained child sitting on it. Essentially, the relationship between occupant weight and the sensed pressure is empirically determined at a variety of temperatures, and the data is used to construct either a mathematical model or a multi-dimensional look-up table of occupant weight as a function of temperature and sensed pressure, with the model or table programmed into PODS ECU 40 and used to determine the occupant weight.

According to the present invention, the difficulty in distinguishing between a small adult seat occupant and a child seated on a booster seat is resolved by performing an early characterization of the seat occupant in an interval following a transition event such as a door opening or ignition state change. If desired, such transition event may be the same event(s) used to activate or wake-up PODS ECU 40. During this interval, an initial characterization routine monitors the seat belt tension signal SBT and the raw seat pressure PS to identify signal values characteristic of a minimum weight adult or a child seated on a booster seat. Essentially, the pressure variation during the initial interval is significantly higher for a small adult than for a child on a booster seat, and the seat belt tension is significantly higher for a child on a booster seat than for a small adult. If the indicated occupant weight during subsequent operation of the vehicle is inconsistent with the initial characterization, the initial characterization is discarded, and the seat occupancy is characterized based on the indicated occupant weight.

Figure 2:
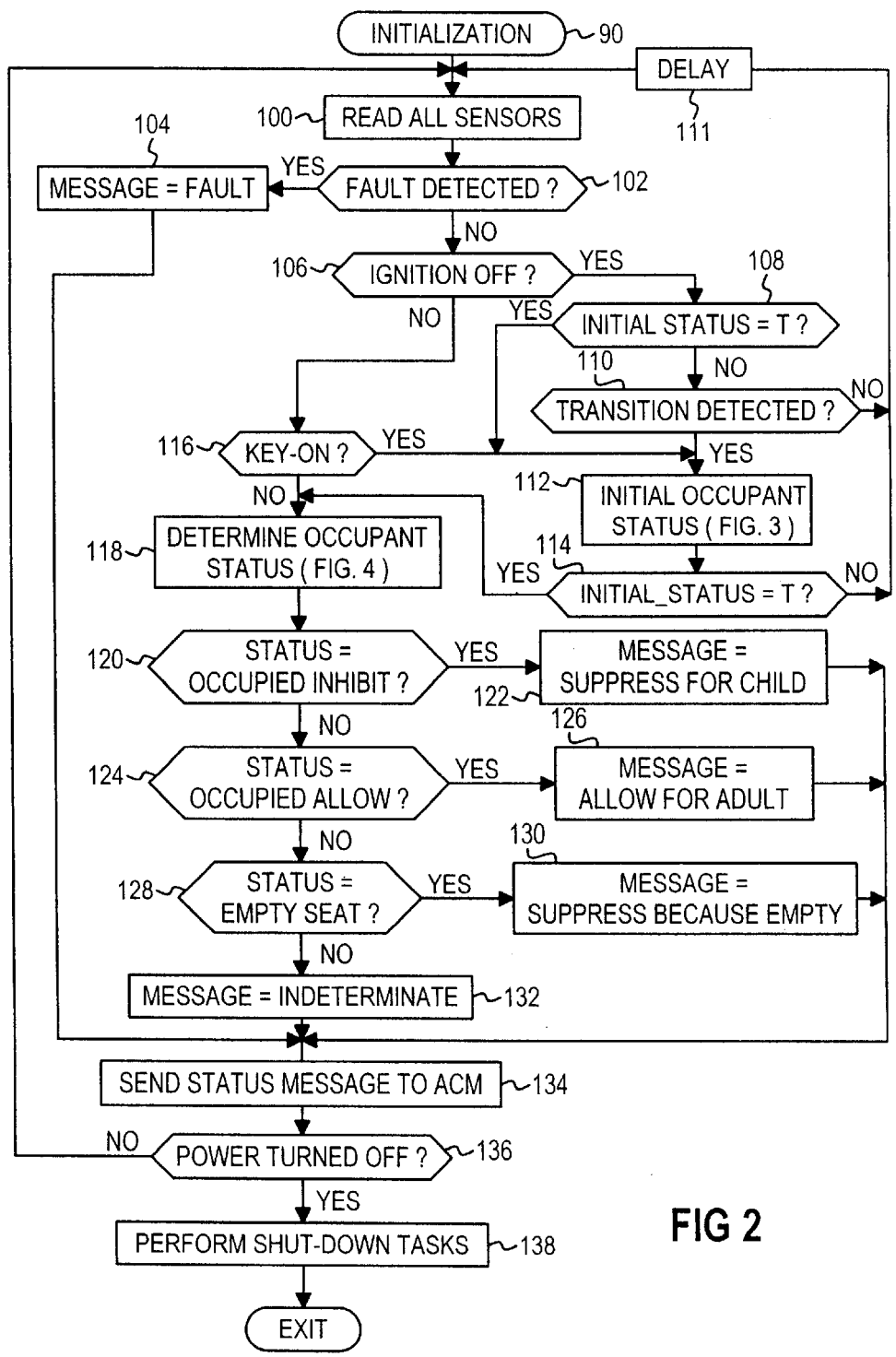
FIGS. 2, 3 and 4 depict a flow diagram representative of a software routine executed by the PODS ECU of FIG. 1 in carrying out the method of this invention.
Figure 3:
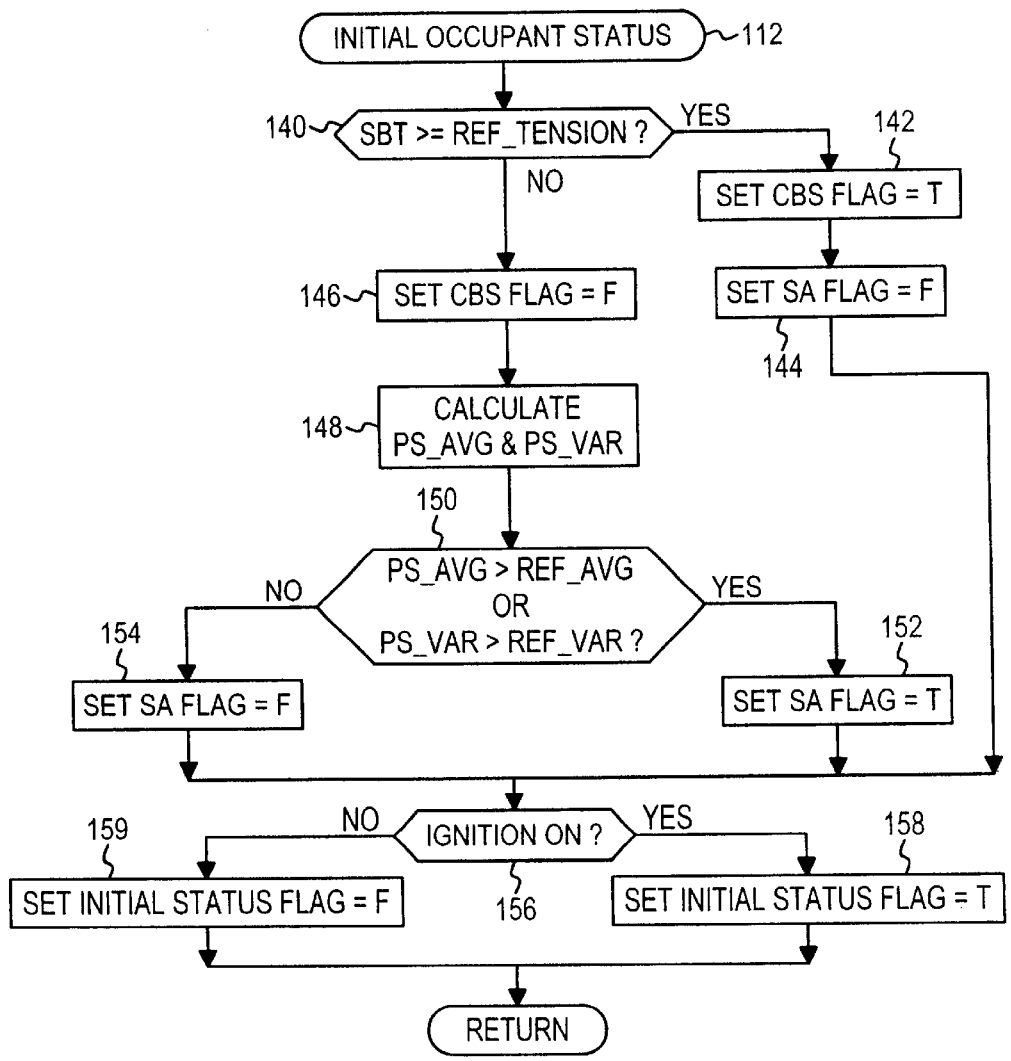
Figure 4:
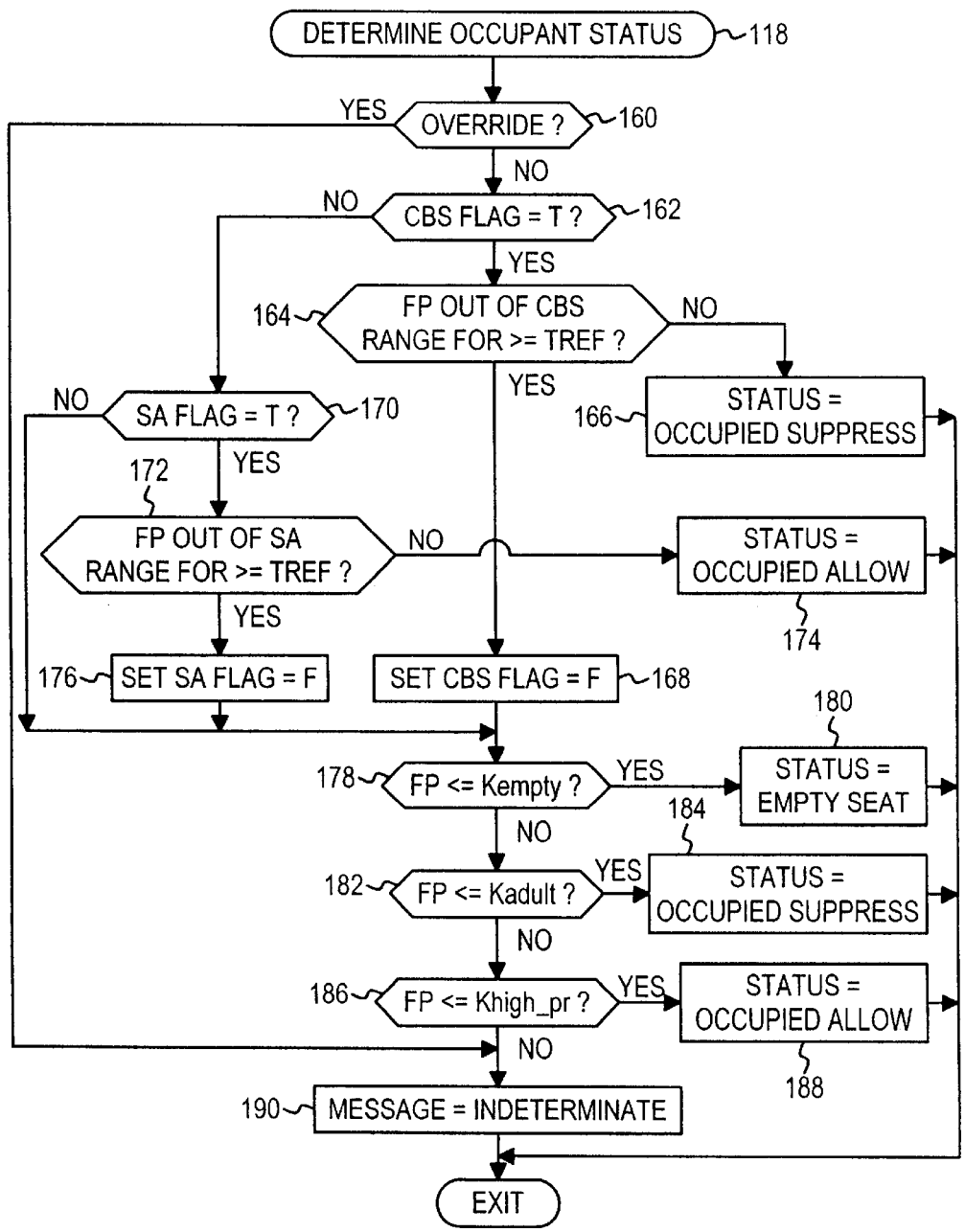

The flow diagrams of FIGS. 2–4 illustrate a software routine periodically executed by the PODS ECU 40 for carrying out this invention. The flow diagram of FIG. 2 represents a main or executive routine, whereas the flow diagram of FIG. 3 details the initial occupant characterization, and the flow diagram of FIG. 4 details the occupant status determination. At the initiation of each period of vehicle operation, the PODS ECU 40 executes an initialization routine as indicated by block 90 of FIG. 2 for initializing various registers, parameters and flags to zero or some other default setting. In the case of this invention, for example, the suppression status (STATUS) may be initialized to a default setting, or to a setting determined in the previous ignition cycle. A similar initialization also occurs in the event of a dynamic reset. Following initialization, the blocks 100–134 are repeatedly executed as shown. The block 100 reads all of the sensor information and performs diagnostic testing of the system and components. If the diagnostic testing detects a fault, the block 102 is answered in the affirmative, and the block 104 sets the status message to FAULT. If no fault is detected, the blocks 106, 108, 110 114 and 116 detect the occurrence of a specified "wake-up" transition, such as a significant change in the measured pressure PS, the initial opening of a Vehicle door, or a transition of the ignition switch. If the ignition switch is OFF, as determined at block 106, block 108 is executed to determine if the INITIAL_STATUS flag is True. The state of the INITIAL_STATUS is determined by the initial occupant status routine of block 112, described in detail below in reference to FIG. 3. If the INITIAL_STATUS flag is True (indicating that the initial occupant status routine of FIG. 4 was executed with the ignition switch ON), the initial occupant status routine is re-executed. If the INITIAL_STATUS flag is False, the block 110 is executed to determine if there has been a significant change in the pressure signal PS or if a door of the vehicle has opened. If no transition is detected, the blocks 100–110 are re-executed after a delay interval, as designated by the block 111. In practice, the delay interval may be mechanized with a fixed interval interrupt, so long as an interrupt is also generated whenever an ignition state change and/or a transition of the type detected by block 110 occurs.

If the block 110 detects a transition, the initial occupant status routine of block 112 is executed to determine if initial characterization of the seat occupant is possible. The initial occupant status routine is also executed at each off-to-on (key-on) transition of the ignition switch, as detected by blocks 106 and 116. Once the initial occupant routine has been executed, the block 114 determines if the INITIAL_STATUS flag is True. If not, the ignition switch is still OFF, and the blocks 100–110 are re-executed after the delay interval of block 111; if so, the ignition switch is ON, and the block 118 is executed to determine the occupant status, as detailed in the flow diagram of FIG. 4.

If the determined occupant status is OCCUPIED INHIBIT, as determined at block 120, the block 122 sets the status message to SUPPRESS FOR CHILD. If the occupant status is OCCUPANT ALLOW, as determined at block 124, the block 126 sets the status message to ALLOW FOR ADULT. And if the occupant status is EMPTY SEAT, as determined at block 128, the block 130 sets the status message to SUPPRESS BECAUSE EMPTY. If blocks 120, 124 and 128 are answered in the negative, the block 132 sets the status message to INDETERMINATE. The block 134 then sends the determined status message to ACM 42, and the block 136 checks for removal of system power. When system power is removed, the block 138 is executed to perform shut-down tasks, and the routine is exited.

Referring now to FIG. 3, the initial occupant characterization involves monitoring the seat belt tension SBT and the raw (unfiltered) seat pressure signal PS to detect signal characteristics representative of an adult occupant vs. a child on a booster seat. In general, the pressure variation during the initial interval is significantly higher for a small adult than for a child on a booster seat, and the seat belt tension may be significantly higher for a child on a booster seat than for a small adult. The block 140 is first executed to determine if SBT exceeds a reference tension REF_TENSION indicative of the tension ordinarily used to Secure a child booster seat. It SBT>REF_TENSION, the blocks 142 and 144 are executed to set the CBS (Child Booster Seat) flag to True, and to set the SA (Small Adult) flag to False. If SBT≦REF_TENSION, the block 146 sets the CBS flag to False, and the block 148 averages pressure signal samples over a specified interval such as two seconds, and calculates the variance PS_VAR of the sampled values. Calculating the variance involves forming a sum $SUM_{ps}$ of the pressure signal samples, and then calculating a sum of squares $SQUARE\_SUM_{ps}$ and a variance value PS_VAR as follows:

$$SQUARE\_SUM_{ps}=[SQUARE\_SUM_{ps}+PS_i^2]/REF1$$

$$PS\_VAR=SQUARE\_SUM_{ps}-(SUM_{ps}/SAMPLES)^2$$

If the average of the pressure samples PS_AVG over the specified interval exceeds a reference value REF_AVG or the calculated variance PS_VAR exceeds a reference value REF_VAR, as determined at block 150, the block 152 sets the SA flag to True. Otherwise, the block 154 sets the SA flag to False. Finally, the blocks 156, 158 and 159 set the state of the INITIAL_STATUS flag based on the state of the ignition switch, completing the routine. If the ignition switch is on, the block 158 sets the INITIAL_STATUS flag to True; if the ignition switch is off, the block 159 sets the INITIAL_STATUS flag to False.

Referring not to the occupant status determination of FIG. 4, the block 160 is initially executed to determine if there has been an override of the occupant sensing system. If so, the block 190 sets the status message to INDETERMINATE, and the routine is exited. Usually, however, block 160 will be answered in the negative, and the blocks 162–188 are executed to set the occupant status (STATUS) according to the detected occupant weight and the status of the SA and CBS flags.

The blocks 162 and 170 check to see if the CBS or SA flags are True. When the CBS flag is TRUE, as determined at block 162, the block 164 determines if a filtered version of the sensed pressure (FP) has been out of a range normally associated with a child booster seat (CBS Range) for at least a predetermined interval TREF. If not, the block 166 sets STATUS to OCCUPIED SUPPRESS, completing the routine. However, if block 164 is answered in the affirmative, the block 168 sets the CBS flag to False, effectively discarding the characterization of the initial occupant status routine. Similarly, when block 170 determines that the SA flag is True, the block 172 determines if the filtered pressure FP has been out of a range normally associated with a small adult (SA Range) for at least a predetermined interval TREF. If not, the block 174 sets STATUS to OCCUPIED ALLOW, completing the routine. However, if block 172 is answered in the affirmative, the block 176 sets the SA flag to False, effectively discarding the characterization of the initial occupant status routine.

The block 178 then compares the filtered pressure FP to a factory calibrated threshold Kempty indicative of an unoccupied seat. If FP is less than or equal to Kempty, the block 180 sets STATUS to EMPTY SEAT, completing the routine. If FP exceeds Kempty, but is less than or equal to a predetermined threshold Kadult indicative of an occupant slightly smaller than a $5^{th}$ percentile adult female, the block 182 is answered in the affirmative, and the block 184 sets STATUS to OCCUPIED SUPPRESS, completing the routine. If FP exceeds an unrealistically high threshold Khigh_pr, a reliable indication of occupant position cannot be obtained, and the block 190 sets STATUS to INDETERMINATE, and the routine is exited. However, if FP is between Kadult and Khigh_pr, the block 186 is answered in the affirmative, and the block 188 sets STATUS to OCCUPIED ALLOW, completing the routine. Although not shown, the routine will preferably include a degree of hysteresis to prevent STATUS from toggling between two different states; once STATUS stabilizes in a given state, the hysteresis values can be increased to reduce sensitivity to road noise, occupant movement, and so on.

In summary, the present invention provides a simple and reliable method of distinguishing between a minimum weight adult and a child sitting on a booster seat, and advising the driver accordingly. While illustrated in reference to the illustrated embodiment, it is expected that various modifications will occur to persons skilled in the art. For example, this invention is not limited to pressure based bladder systems, and may be applied equally as well to other occupant detection systems, as indicated above. Accordingly, it should be understood that occupant characterization methods incorporating these and other modifications may fall within the scope of this invention, which is defined by the appended claims.

What is claimed is:

1. A method of characterizing an occupant of a vehicle seat for allowing or suppressing deployment of an inflatable restraint, the method comprising the steps of:
    detecting an event indicative of vehicle entry at a beginning of a period of vehicle operation, and in response to such detection, initially characterizing the occupant of the vehicle seat based on a measure of weight applied to the vehicle seat and a measure of tension applied to a seat belt for the vehicle seat;
    subsequently characterizing the occupant of the vehicle seat during said period of vehicle operation based on the measure of weight applied to the vehicle seat; and
    allowing or suppressing deployment of the inflatable restraint based on (1) the initial characterization if the measure of weight applied to the vehicle seat during said period of vehicle operation is consistent with the initial characterization, and (2) the subsequent characterization if the measure of weight applied to the vehicle seat during said period of vehicle operation is inconsistent with the initial characterization.

2. The method of claim 1, wherein said event indicative of vehicle entry includes one or more of the following: (1) opening of a vehicle door, (2) changing state of a vehicle ignition switch, and (3) a substantial change in the measured weight.

3. The method of claim 1, including the step of:
    initially characterizing the occupant of the vehicle seat as a child on a booster seat if the measure of tension applied to said seat belt exceeds a predetermined tension threshold indicative of a tension normally used to secure a child booster seat.

4. The method of claim 3, wherein if the occupant is initially characterized as a child on a booster seat, said step of allowing or suppressing deployment of the inflatable restraint includes the steps of:
    comparing the measure of weight to a predetermined weight range that occurs when the occupant is a child on a booster seat; and determining that the measure of weight is consistent with the initial characterization until the measure of weight remains outside said predetermined weight range for at least a predetermined period of time, and then determining that the measure of weight is inconsistent with the initial characterization.

5. The method of claim 3, including the step of:

initially characterizing the occupant of the vehicle seat as a small adult if the measure of tension applied to said seat belt is less than said tension threshold and a variation of the measure of weight applied to said vehicle seat exceeds a predetermined variance threshold.

6. The method of claim 5, wherein if the occupant is initially characterized as a small adult, said step of allowing or suppressing deployment of the inflatable restraint includes the steps of:

comparing the measure of weight to a predetermined weight range that occurs when the occupant is a small adult; and determining that the measure of weight is consistent with the initial characterization until the measure of weight remains outside said predetermined weight range for at least a predetermined period of time, and then determining that the measure of weight is inconsistent with the initial characterization.

7. The method of claim 3, including the step of:

initially characterizing the occupant of the vehicle seat as a small adult if the measure of tension applied to said seat belt is less than said tension threshold and the measure of weight applied to said vehicle seat exceeds a predetermined weight threshold.

8. The method of claim 7, wherein if the occupant is initially characterized as a small adult, said step of allowing or suppressing deployment of the inflatable restraint includes the steps of:

comparing the measure of weight to a predetermined weight range that occurs when the occupant is a small adult; and determining that the measure of weight is consistent with the initial characterization until the measure of weight remains outside said predetermined weight range for at least a predetermined period of time, and then determining that the measure of weight is inconsistent with the initial characterization.

\* \* \* \* \*